Oct. 4, 1938.    R. R. RAND, JR    2,132,187
AERIAL TRAVELING DEVICE
Filed April 20, 1934    4 Sheets-Sheet 4

Inventor:
RUFUS R. RAND JR
By
Attorney.

Patented Oct. 4, 1938

2,132,187

UNITED STATES PATENT OFFICE 2,132,187

AERIAL TRAVELING DEVICE

Rufus R. Rand, Jr., Minneapolis, Minn.

Application April 20, 1934, Serial No. 721,504

13 Claims. (Cl. 104—23)

This invention relates to a device comprising a small wire-like member acting as a support and current conducting member and a traveling member in the form of or simulating a car, transporting means or flying object suspended from and traveling on said member. Said member comprises a pair of electrical conductors closely adjacent but insulated from each other and means are provided for supporting said member in a room at a considerable height above the floor so that the said car, means or object may simulate an aeroplane or other airship, a space ship or a bird. The device will have great utility as a toy and will also have great utility when used as a change carrier or bundle carrier in a store and the same is capable of other commercial applications.

It is an object of this invention to provide a device comprising a member of small cross sectional dimension comprising a pair of closely spaced conductors together with means for supporting said member from the walls of a room and at a considerable height above the floor of said room whereby said member will extend around the room at quite a great height, together with means supported and adapted to travel on said member comprising wheels which are driven or rotated by current supplied from said member.

It is another object of the invention to provide such a device as set forth in the preceding paragraph, said member having portions extending therefrom upon an incline to and from a plane adjacent the floor of said room, said means being adapted to travel up and down said portions to the part of said member which extends around the room in the plane at a considerable height above the floor.

It is another object of the invention to provide a simple and efficient form of current-conducting and supporting means comprising closely spaced exposed electrical conductors of small cross sectional area with insulating means therebetween.

It is a further object of the invention to provide such a member as set forth in the preceding paragraph, said insulating material extending below said conductors and supporting means for said member being secured thereto.

It is an object of the invention to provide a simple and efficient form of current-conducting and supporting means in the form of a wire-like member of small cross sectional area comprising closely spaced exposed eletcrical conductors with insulating means therebetween, the top surfaces of said conductors being roughened, knurled or corrugated to furnish additional traction.

It is a further object of the invention to provide a device comprising a member comprising a pair of spaced electrical conductors, a wheel supported on and adapted to travel on said member, a frame supported by said wheel and means on said frame for turning said wheel for causing the same to move along said member, said means being operated by current supplied from said member and through said wheel.

It is still another object of the invention to provide a novel form of wheel adapted to travel along a member of small cross-sectional area having spaced and insulated conductors, said wheel having a portion at one side of a plane extending at right angles to its axis made of conducting material and the portion at the other side of said plane made of non-conducting material.

It is a still further object of the invention to provide a member of wire-like construction forming a conductor and a wheel traveling on and supported on said member having a grooved periphery, said wheel being constructed and arranged to be rotated by gearing carried thereby and driven by means operated by current from said conductor.

It is still another object of the invention to provide a wire-like member adapted to be suspended at a considerable height and comprising spaced electrical conductors together with means traveling on and supported by said member operated by current from said conductors and carrying an object which may simulate an aeroplane, dirigible, space ship, stratosphere balloon or which may take various commercial forms such as a change carrier or a bundle carrier, or be formed as a bird.

It is still another object of the invention to provide a current-conducting and supporting means in the form of a member of small cross-sectional area comprising spaced conductors and an object supported by and adapted to travel along said member, said object being supported by said member and the supporting means comprising a single wheel having portions adapted to engage said conductors respectively and conduct current therefrom for operating means carried by said object for driving said wheel.

It is more specifically an object of the invention to provide a current-conducting and supporting means in the form of a member of small cross-sectional area comprising closely spaced and exposed conductors, a pair of peripherally grooved wheels running on and supported by said member, a frame carried by said wheels, a motor mounted on said frame having an armature shaft, worm gears carried by said armature shaft, said wheels having their peripheries formed as worm wheel gears meshing with said worm gears, said motor being driven by current from said conductors transmitted through said wheels.

These and other objects and advantages of the invention will be fully set forth in the following description made in connection with the accompanying drawings, in which like refrence characters refer to similar parts throughout the several views and in which:—

Referring to the drawings, a device is shown comprising as one important element thereof a member 20 forming a support and conductor for electrical current. While the member 20 may be variously formed, in one embodiment of the invention it is shown as formed of members 20a of substantially semi-cylindrical shape in cross section thus having a flat side. The flat sides of the members 20a are secured to a thin strip 20b of insulating material and this material 20b may extend below the members 20a to form a supporting means therefor.

Figures 3, 4, 5, 6, 7:
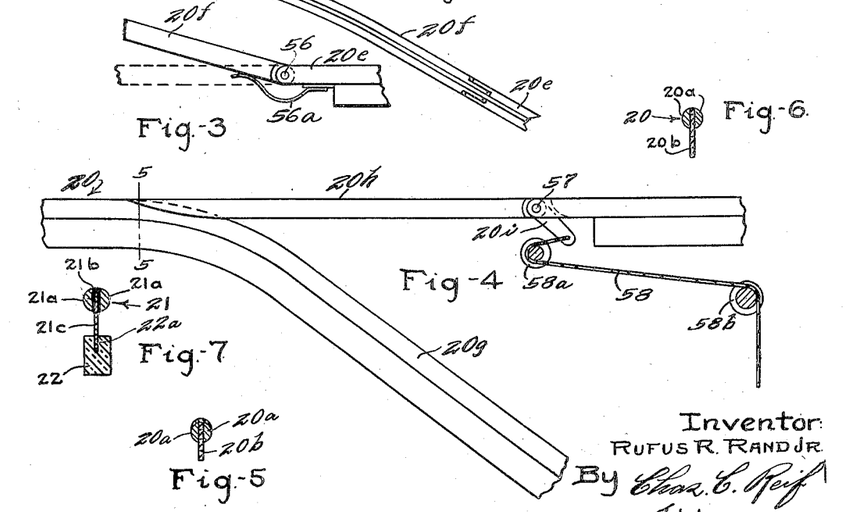
Fig. 3 is a partial view in side elevation of the structure in Fig. 2.
Fig. 4 is a view in side elevation of another portion of the supporting and current-conducting means.
Fig. 5 is a vertical section on line 5—5 of Fig. 4.
Fig. 6 is a vertical section on line 6—6 of Fig. 2.
Fig. 7 is a view similar to Fig. 6 showing a modification.

An alternative form is shown as 21 in Fig. 7. In this form substantially semi-cylindrical members 21a have their flat sides connected by a layer of adhesive rubber-like material 21b. A sheet of rather heavy glazed paper 21c is disposed between members 21a and the material 21b and this strip extends below members 21a and is secured in a slot or slit 22a formed in a block of insulating material 22. The paper 21c is quite stiff and a simple and firm support for member 21 is thus formed. The member 20 is adapted to be supported in spaced relation to the wall of a room and at considerable height above the floor thereof so that it is much closer to the ceiling of the room than to the floor. While various means may be used to support member 20, in the embodiment of the invention illustrated, it is shown as supported by a plurality of brackets 23, some of which are of the form shown in Figs. 1, 8 and 9 and comprises a horizontal member 23a extending substantially horizontally from the wall and having at one end a foot or flange member 23b having an outer surface adapted to engage said wall. While the member 23b may be variously formed to be secured to the wall, in the embodiment of the invention illustrated, it is shown as in the form of a vacuum cup. Bracket 23 comprises a rod 23c slidable in member 23a and adapted to be held at the desired position relative thereto by a set screw 24 preferably in the form of a thumb screw. Member 23c has secured to its outer end in any suitable manner as by the screw 25, portion 20b of member 20 or portion 21c of member 21. Bracket 23 also has brace arms 23d extending downwardly and to each side of member 23a, the same also being provided with members 23b. The brackets 23 can be placed in position by pressing the cups 23b firmly against the smooth surface of the wall.

The member 20 is also shown as supported by brackets 27 adapted to be supported from a picture molding or cornice strip 28 extending about the wall of the room adjacent the ceiling thereof. Said bracket is shown as having a sheet metal portion 27a bent to fit over the molding 28 and a portion 27b is secured to portion 27a adjacent molding 28 by the screw 29. Portion 27a extends below portion 27b and is formed to engage the wall 30. A rod-like portion 27c slides in portion 27b and is held in adjusted position by thumb screw 31. Rod 27c has secured thereto portion 20b of member 20 or portion 21c of member 21.

Figure 1:
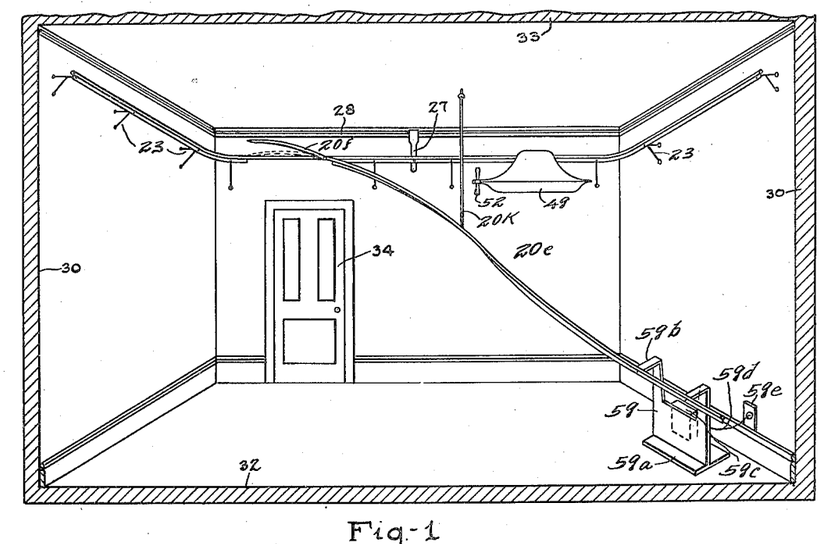
Fig. 1 is a perspective view of the interior of a room illustrating the invention in position therein.
Figure 2:
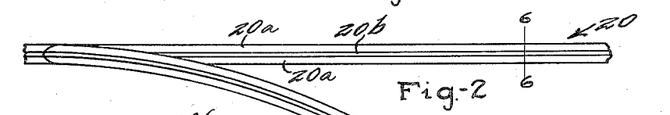
Fig. 2 is a plan view of a portion of the elevated supporting and current-conducting means.

In Fig. 1 the interior of a room in which the invention is mounted is shown comprising the walls 30, the floor 32 and the ceiling 33. A door 34 is also shown.

Figure 8:
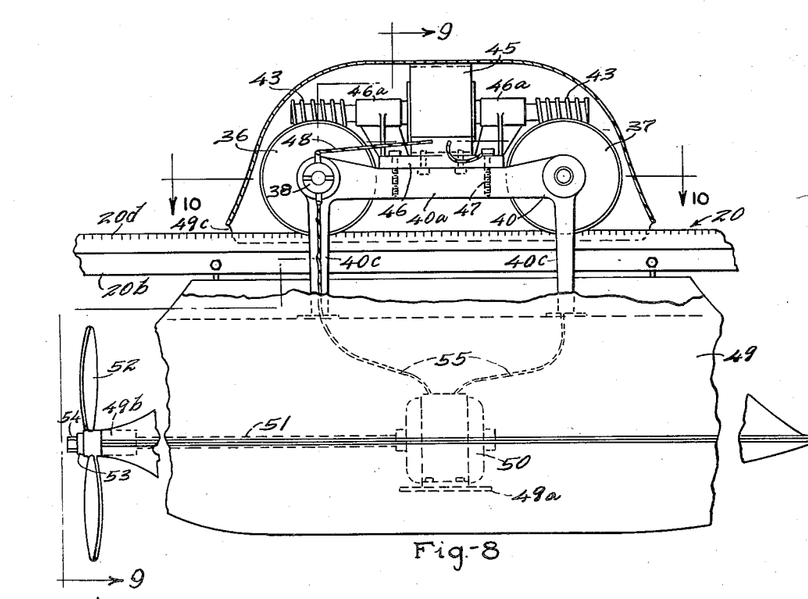
Fig. 8 is a vertical section on line 8—8 of Fig. 9 as indicated by the arrows.
Figures 9, 11, 12, 13:
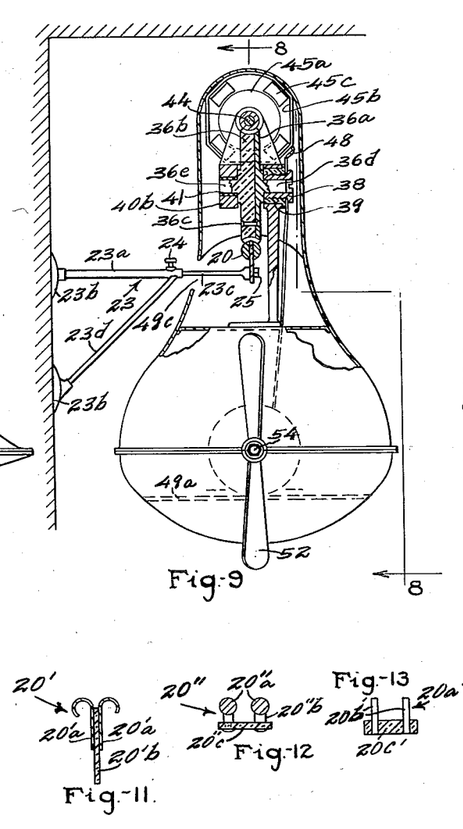
Fig. 9 is a vertical section on line 9—9 of Fig. 8 as indicated by the arrows.
Figs. 11, 12 and 13 are vertical sections showing modifications of the supporting and current-conducting member.
Figure 10:
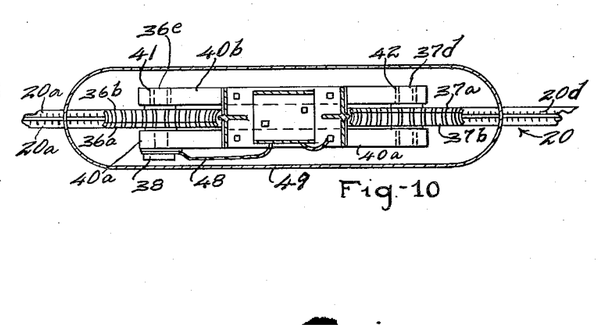
Fig. 10 is a horizontal section on line 10—10 of Fig. 8 as indicated by the arrows.

Running upon the member 20 which forms a supporting track is a pair of wheels 36 and 37 spaced longitudinally of the track. The wheel 36 has a portion 36a disposed at one side of a plane extending perpendicularly to the axis thereof and thus forming one side of the wheel, which portion is made of steel, brass, or other metal forming a good conductor of electricity. The portion 36b at the other side of said wheel is made of hard fiber or other non-conducting material. Said parts are connected by a plurality of rivets 36c. Portion 36a has an axle 36d formed thereon which is journaled in a headed screw 38 having a slotted head and said screw is threaded into an insulated bushing 39, in turn secured in one side bar 40a of a frame designated generally as 40. The portion 36b has an axle 36e formed thereon running in a small bushing 41 secured in the other side bar 40b of frame 40. It will be seen that the axle 36d is thus insulated from frame member 40. The structure of wheel 37 is similar to that already described except that a common axle 37d is secured to the conducting portion 37a of the wheel, which axle is journaled at its ends in small bushings 42 in frame members 40a and 40b, which bushings will be of conducting material. The conducting portion of wheel 37 is thus in electrical contact with frame 40. It will also be noted that wheel 37 is reversed in relation to wheel 36, the conducting portions of said wheels running respectively in contact with the portions 20a of member 20. Wheels 36 and 37 have grooved peripheries and said peripheries are provided with teeth to form worm wheel gears. Said worm wheel gears mesh respectively with the worm gears 43 secured to a shaft 44 forming the armature shaft of a motor 45, said shaft being journaled in bearings 46a disposed at each side of said motor and forming parts of a bracket 46 mounted upon the frame 40 and connected thereto by bolts 47. A conductor 48 connected to a clip secured under the head of screw 38 extends to the motor 45 and the other terminal of said motor is connected to the frame 40. Motor 45 comprises the rotating armature 45a and the field coils 45c secured to the frame member 45b extending in U-shaped form over the top of the armature. Supports 40c depend from frame 40 and support an object 49 illustrated as in the shape of a car simulating a dirigible airship. Car 49 has one side continuous and the same extends over the top of frame 45b enclosing the motor and wheels 36 and 37. The wall of said car at its other side is provided with a slot or opening 49c in order that the same will clear the brackets 23 and so that the device can be placed in position with wheels 36 and 37 on track 20. The car 49 is provided with a plate or platform 49a therein and an electrical motor 50 is mounted thereon. Motor 50 has an armature shaft 51 extending therefrom and journaled in a bearing 49b in the car 49. Shaft 51 has secured thereto at the outer end of the car 49 a propeller 52, said shaft shown as being equipped with a washer 53 and a nut 54 at the outer end of the hub of propeller 52. Suitable conductors 55 will extend to motor 50 from conductor 48 and the frame 40 so that said motor will be driven by current from the track 20.

In Fig. 1 a portion of the track 20 is shown designated 20e which extends from a plane adjacent the floor 32 upwardly in an inclined direction and has an upper portion 20f which is laterally curved and has its extremity vertically alined with the portion of track 20 which extends around the room and is supported by the brackets 23. Portion 20f is hinged to the portion 20e by the pivot member 56 and the same is normally held in upwardly inclined position above the portion of track 20 extending about the wall by a spring 56a secured to the bottom portion of track 20e and having a free end engaging the under side of portion 20f. Support 20k supports portion 20e from the ceiling, and may comprise a vacuum cup at its upper end.

The track 20 extending about the upper part of the room and supported by brackets 23 also has a descending inclined portion 20g which is continuous with track 20 and bent downwardly as shown in Fig. 4. A hinged section 20h is provided having a tapered terminal overlying track 20, the same being hinged by the pivot 57. Portion 20h has a downwardly extending arm 20i secured thereto, both said arm and portion 20h being oscillatable about the axis of pivot 57. A flexible member such as a cord 58 is connected to the arm 20i, the same running over grooved pulleys 58a and 58b and extending to a convenient point near the floor for operation. Pulleys 58a will be supported in any suitable manner from the wall or ceiling. The portion of track 20e extends downwardly to a supporting member 59 comprising a panel having a floor-engaging flange 59a at its lower portion. Member 59 has arms with outwardly projecting portions 59b to which the track 20e is secured. Panel 59 will have attached thereto a transformer 59c of the type commonly used with electrical toys and a conductor 59d will extend from transformer 59c to the wall socket 59e. A connector plug will as usual be connected to the cord or conductor 59d to be inserted in the wall socket 59e.

In operation, the track 20 will be supported at quite a height above the wall of the room as shown in Fig. 1 and the device will be placed thereon with the wheels 36 and 37 resting on and supported on the track as shown in Figs. 8 and 9. It will be seen that the device can readily be placed on the track by the track and the supports entering through the opening 49c. Current will be supplied to the track through the transformer 59c. Such transformers usually have a rotatable handle controlling a rheostat to increase or decrease the voltage of the current supplied to the track. The current from one of the conductors 20a will pass through a portion 36a of wheel 36, through axle 36d and through conductor 48 to the motor 45. Current from the other conductor 20a will pass through portion 37a of wheel 37 to the axle 37d and will be transmitted to the frame 40. From this frame it will be transmitted to one terminal of the motor. The armature 45a of the motor is thus rotated and rotates shaft 44 and worm gears 43. Worm gears 43 drive the worm wheel gears formed on the peripheries of wheels 36 and 37 and said wheels are thus rotated or driven. The wheels 36 and 37 thus move along the track 20 carrying the car 49 with them. The corrugations 20d in the track 20 give additional traction. In addition to the driving means comprising motor 45 and wheels 36 and 37 the motor 50 is also driven and propeller 52 driven at high speed. This gives further propelling power and adds to the effect of the car being driven by its propeller alone. The motor 45 and the wheels 36 and 37 and adjacent parts are obscured by the shell of car 49 and thus are not seen as the car moves along the track. This adds to the impression that the car is being driven through the air or space by its propeller. The track 20 is quite small and is really shown in exaggerated form in Figs. 8 and 9. The car can be brought down to the floor when desired by the operator pulling upon the string 58. This raises the section 20h of the track and the car then moves downward on the incline 20g. The car can again ascend to the track 20 by moving up the incline 20e. As the wheels move onto the portion 20f it is depressed against the tension of spring 56a and its terminal descends in vertical alinement with track 20. The terminal of member 20f will be made to rest quite closely on top of the track 20 and the wheels 36 and 37 merely roll off of the end of section 20f onto the track 20 extending about the room. When the wheels have passed off of the section 20f it is elevated by the spring 56a and the car can thereafter move along the track 20 beneath the section 20f. The voltage can be controlled as desired from transformer 59c. The wheels 36 and 37 carrying the car 49 will run up a very steep grade as has been found in practice. The car 49 is thus propelled about the room at considerable height and gives the effect of an aircraft. As previously stated the car 49 can take various forms and can be made to simulate various aircraft or flying objects. The wheels 36 and 37 permit an oscillation of the car 49 transversely of the track and the track has some flexibility and when supported in long stretches between the supports extends downward in a slight curve. This does not interfere with the motion of the car but tends to break up a straight rectilinear motion and heighten the effect of the car moving through the air or space.

In Fig. 11 a modified form of supporting track and conductor is shown. The same comprises a member 20' having flat strips 20'a of copper or other conducting metal, the same having their adjacent sides secured to a thin strip 20'b of insulating material. At their upper edges and above member 20'b the strips 20'a have their ends turned outwardly and downwardly in substantially semi-cylindrical form. The wheels 36 and 37 can run upon the track 20' as they do on the track 20.

In Fig. 12 another form of track is shown comprising a member 20" having spaced cylindrical conducting wires 20"a secured to posts 20"b in any suitable manner as by soldering or welding. Posts 20"b extend through and are riveted onto a flat strip 20"c of insulating material. The track 20" will support peripherally grooved wheels such as 36 and 37 and supply current thereto.

In Fig. 13 a member 20a' is shown forming a track and conducting member, the same comprising flat strips 20b' having one side and edge projecting above a block 20c' of insulating material. Strips 20b' can be secured to block 20c' in any suitable manner as by an adhesive. The strips 20b' will be embraced and have supported thereon grooved wheels such as the wheels 36 and 37. The tracks 20', 20" and 20a' will be supported in any suitable manner as by supports attached to the insulating members thereof.

Figures 14, 15, 16, 17:
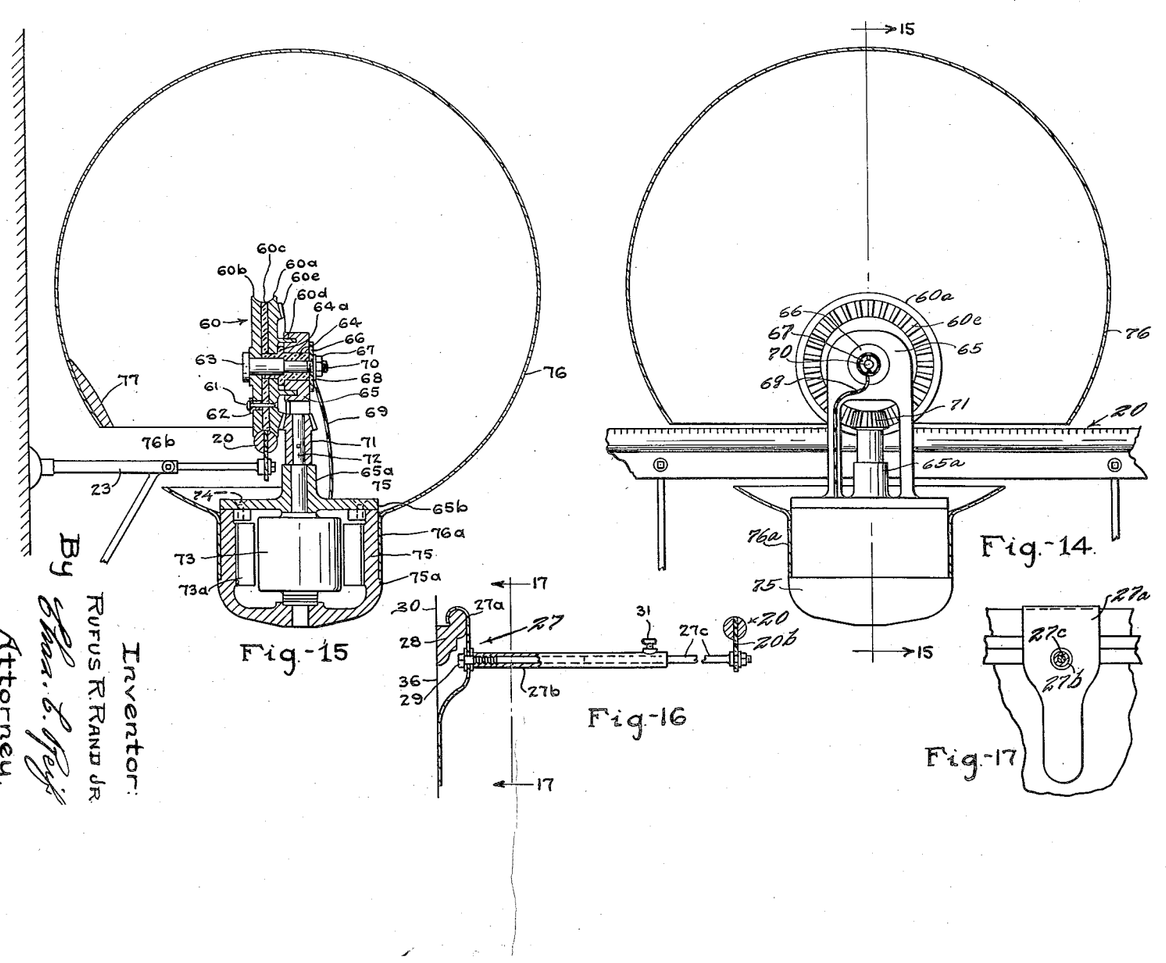
Fig. 14 is a view in side elevation of a modification, a portion thereof being shown in vertical section.
Fig. 15 is a vertical section on line 15—15 of Fig. 14.
Fig. 16 is a view in vertical section partly in elevation of a supporting bracket and track.
Fig. 17 is a vertical section on line 17—17 of Fig. 16.

Referring to Figs. 14 and 15, the supporting track 20 as already described is shown, supported by bracket 23. A wheel designated generally as 60 is shown having a grooved periphery embracing the top of track 20 so that said wheel is arranged to run along the top of said track. Wheel 60 comprises spaced metallic portions 60a and 60b each in the form of a disk, said portions being separated by an insulating portion or disk 60c. Said portions 60a, 60b and 60c are connected by a plurality of headed rivets 61, which extend through a headed bushing 62 in portion 60b so that portions 60a and 60b are electrically insulated from each other. An axle 63 is provided in the form of a headed stud having its head engaging the outer side of portion 60b, said axle extending through and in contact with portion 60b and extending also through a bushing 64 of insulating material, which bushing has a portion extending through portion 60a and disk 60c. Bushing 64 also has a cylindrical portion extending through a frame member 65. A collar portion 64a on bushing 64 is disposed between the wheel 60 and frame member 65. A washer 66 of insulating material is disposed against the outer side of frame member 65 and the end of stud 63 is threaded to receive a nut 67 engaging a clip 68 disposed under said nut and in engagement with axle or stud 63, to which clip a conductor 69 is connected. A pin 70 may also be inserted through the threaded end of stud 63 at the outer side of nut 67 which may be in the form of a cotter pin or split key. Frame member 65 is provided with an annular groove at the side adjacent the wheel 60 and portion 60a of said wheel has an annular flange 60d adapted to rotate in said annular groove, said portion 60a thus being in electrical contact with frame member 65. Portion 60a is provided with a beveled gear portion 60e and a beveled gear pinion 71 meshes with said portion. Gear 71 is secured to the upper end of a shaft 72 forming the armature shaft of an electrical motor 73, said shaft being journaled in a bearing 65a supported on a plate 65b forming part of the frame 65. Plate 65b is secured by the screws 74 to a casing or housing 75 on which the field coils 73a of motor 73 are mounted. The shaft 72 at the other end of the motor is also journaled in a bearing formed in the end of casing 75. A thin substantially spherical casing 76 is secured to casing 75, the same having a cylindrical portion 76a embracing casing 75 and illustrated as having its end resting against a shoulder 75a formed in a projecting ring on the exterior of casing 75. The casing 76 extends above the track 20 and encloses the wheel 60 and frame 65, the same being provided with an opening 76b adapted to provide clearance for the bracket 23 as the device moves along track 20 also to provide means for placing the device on said track. Casing 76 may be provided with a weighted portion 77 so that the center of gravity of the device will be in line with the track 20 and so that the device will assume the position shown in Fig. 15. The conductor 69 will be connected to one terminal of the motor 73 and the other terminal of the motor will be connected to the frame 65 or casing 75.

In operation, the track 20 will have current supplied to its portions 20a and current will be conducted from one of said portions by wheel portion 60b through axle 63 to clip 68, conductor 69 and motor 73. Current will be conducted from the other portion 20a by and through wheel portion 60a to the frame 65 and casing 75 and thus to motor 73. Motor 73 will thus be operated and its armature shaft 72 rotated. This will rotate gear 71 and said gear will rotate beveled gear 60e. Wheel 60 will thus be rotated and will move along track 20. As previously stated the top of portions 20a of track 20 will be roughened, knurled or corrugated and the periphery of wheel 60 will preferably be corrugated so that additional traction may be had. The supporting member 20 is quite small and as the member 76 moves along the wire it simulates the action of a balloon moving through the atmosphere or a stratosphere balloon.

Figure 18:
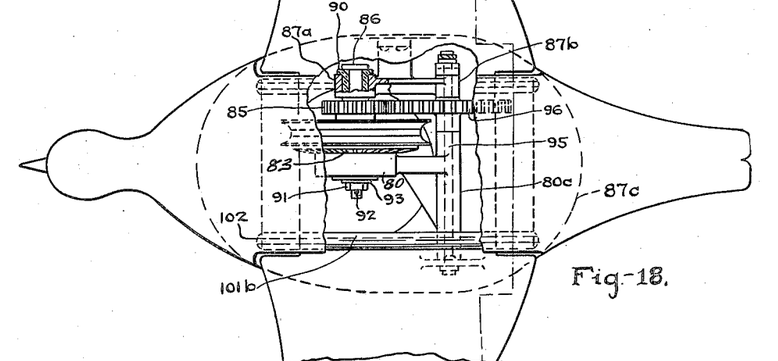
Fig. 18 is a plan view showing a modification, some parts being broken away.
Figure 19:
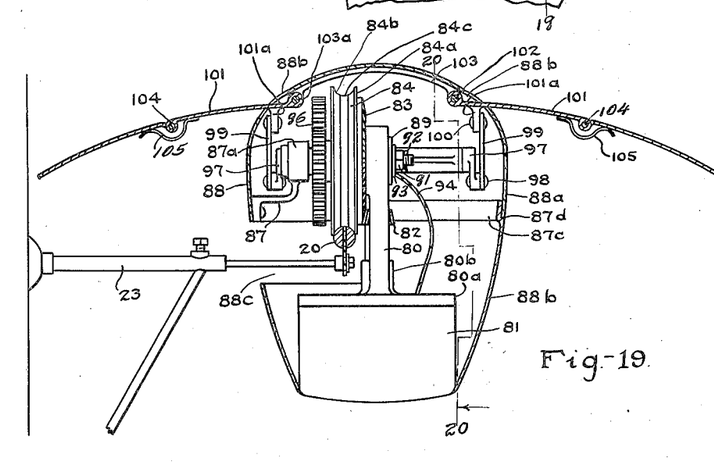
Fig. 19 is a vertical section on line 19—19 of Fig. 18 as indicated by the arrow.
Figure 20:
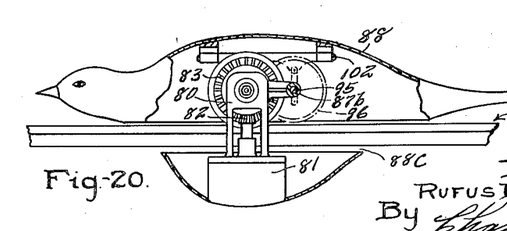
Fig. 20 is a vertical section on line 20—20 of Fig. 19 as indicated by the arrow.

Referring to Figs. 18 to 20, a modification is shown in which the object supported and moving on track 20 is in the form of a flying bird. A frame 80 is provided quite similar to frame 65 shown in Figs. 14 and 15, to which is attached a plate 80a fastened by suitable screws to a casing 81 similar to casing 75 and in which is disposed a motor (not shown) similar to motor 73. Frame 80 has an upstanding bearing 80b similar to portion 65a shown in Figs. 14 and 15 in which the armature shaft of the motor is journaled and said shaft has secured thereto a beveled gear pinion 82 similar to pinion 71. Pinion 82 meshes with a beveled gear 83 formed on the side of a wheel 84 similar to wheel 60. Wheel 84 comprises the metallic sections 84a and 84b separated by the section 84c of insulating material. Wheel 84 has secured to one side thereof a spur gear 85. An axle 86 in the form of a headed stud extends through a bearing 87a forming part of a bracket 87 secured to the shell or body 88 of the bird, which body or shell is secured at its lower portion in any suitable manner as by welding to the motor casing 81. As shown in Figs. 18 and 20 shell 88 has the forward portion representing the head and front portion of the bird while the casing is formed at the opposite end to represent the tail end of the bird. Said stud 86 extends through said bearing, gear 85 and wheel 84, through the frame 80 in which is disposed a headed or flanged bushing 89 of insulating material the same as shown in Fig. 15. A flanged bushing 90 is also provided in bearing 87a so that axle 86 is insulated from the frame. Axle 86 is threaded at one end to receive a nut 91 and this nut may be further held in place by a pin 92 extending through the end of said axle. A clip 93 is disposed under nut 91 and has a conductor 94 secured thereto extending to one terminal of the motor in casing 81. Wheel section 84a has a portion running in frame 80 similar to portion 60d of wheel section 60a. Bracket 87 has another bearing 87b and a shaft 95 is journaled in this bearing and also in an elongated bearing 80c carried on an arm projecting from frame 80. A gear 96 is secured to shaft 95 and meshes with gear 85. Shaft 95 has secured at its ends adjacent bearings 87b and 96 crank arms 97, the outer ends of which are pivoted by the rivet pivot pins 98 to links 99. The other ends of links 99 are pivotally connected by the rivet pivot pins 100 to lugs 101a projecting downward from wing members 101. Said wing members 101 have elongated lugs 101b journaled on trunnion pins 102. Trunnion pins 102 are fixed in bearings 103a formed at each end of brackets 103 extending across the top portion of the shell 88 and secured thereto in any suitable manner as by welding or riveting. The wings 101 extend outwardly and will be formed to simulate the wings of a bird. Said wings preferably are provided with hinges at their intermediate portions comprising the hinge pintle pin 104 carried in lugs formed on the inner wing section and embraced by lugs formed on the outer wing section. A light plate spring 105 has one end secured to the inner wing section and bears upwardly against the under side of the outer wing section. The shell or casing 88 has an upper portion 88a and this is provided with openings 88b through which the wings 101 project. Said upper section 88a is secured to bracket 87 which has a portion 87c extending along the inner side of shell 88. The lower portion 88b of the shell is secured to bracket 87c and a shoulder 87d is provided along one side thereof, this being the right side as seen in Fig. 19 against which the lower edge of the upper section of section 88a abuts. The shell or casing 88 is provided with a slot or opening 88e along the opposite side so that the device can be placed upon the track 20 and so that the same will clear the bracket 23 in its travel on said track.

In operation, the device will be placed on track 20 as shown in Fig. 19 and will be supported on said track by the wheel 84. Current will be supplied to the two conductor sections of track 20 and will be transmitted through section 84b of wheel 84 to axle 86, to clip 93 and through conductor 94 to the motor in casing 81. Current from the other section of track 20 will be transmitted through section 84a of said wheel to the frame and one terminal of the motor will be connected to the frame so that the motor will thus be operated. The motor will drive pinion 82 and gear 83 and wheel 84 will be rotated and will move along the track 20. Gear 85 will revolve with wheel 84 and will rotate gear 96 and shaft 95. This will rotate the crank arms 97 and links 99 will be raised and lowered in the rotation of said arms. The wings 101 will be raised and lowered about pivot pins 102 and this will give the effect that the bird is flying. As the wings 101 are raised the pressure of the air on the outer wing sections will slightly depress said outer sections against the tension of springs 105. As the wings move downward the resistance of the air will move the outer wing sections to normal position and they will be held in this position when stationary by the springs 105. There is thus some movement of the outer sections of the wings as the wings are raised and lowered and this adds to the flying effect of the bird. As stated the track 20 is quite small and the bird or casing 88 moving thereabout will closely simulate a bird flying through the air.

From the above description it is seen that applicant has provided a comparatively simple and very ingenious device which will have an appealing and rather spectacular effect when used as a toy. As above stated the body supported on the track may represent various kinds of aircraft and these will appear to be traveling through the air. The sections of the track descending to adjacent the floor also enable a rather spectacular effect to be produced when the car or object takes off or moves up one of these sections to the elevated track. It is also evident as above mentioned that the device will have a high degree of utility in commercial embodiments such as a change carrier or a bundle carrier for stores. It is obvious that a plurality or train of cars can run upon the track 20 and that a motor car could also tow a glider or other airship, which latter can either move on the track or through the air. The device has been amply demonstrated in actual practice and found to be very successful and to have a great appeal as a toy.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claims.

What is claimed is:—

1. A trolley wheel of conducting material for running on a longitudinally extending conductor and adapted to be supported thereby, said wheel having a grooved periphery engaging said conductor, said grooved periphery being formed as a worm wheel and a worm meshing therewith for driving said wheel along said conductor.

2. A traveling device having in combination, a supporting member comprising parallel wire-like relatively insulated conductors, means comprising a pair of spaced wheels running on and supported by said member, a motor supported by said wheels and operated by current from said conductors, a shaft driven by said motor, gears on said shaft, said wheels being formed as gears meshing with said first mentioned gears, whereby said wheels are driven from said motor.

3. A traveling aerial toy device comprising a single flexible member of small cross sectional area, consisting of two longitudinally extending portions forming electrical conductors and a non-conducting portion disposed between said portions, means for supporting said member at a considerable height above the floor of a room, a pair of wheels running upon and supported by said member, a frame on which said wheels are mounted, one wheel having a conducting part engaging one of said portions and an insulating part engaging the other portion, the other wheel having a conducting part engaging said other portion and an insulating part engaging said one portion and a casing carried by said frame and disposed principally below said member, said frame and wheels being oscillatable on said member transversely thereof.

4. The combination of a supporting wire-like member comprising parallel longitudinally extending relatively insulated conductors, of a wheel running on said member and having one side made of conducting material to engage one of said conductors to conduct current therefrom and having another portion made of insulating material to engage the other of said conductors, a second wheel having a portion made of conducting material to engage the other of said conductors and a portion of insulating material to engage the first mentioned of said conductors a motor and means for conducting current from the conducting material of said wheels to said motor.

5. In a traveling device the combination of a flexible member of very small cross-sectional area and comprising two longitudinally extending parallel relatively insulated conductors, a pair of wheels running on said member and spaced longitudinally thereof on said traveling device, each of said wheels having two peripheral portions disposed on opposite sides of a plane extending perpendicular to the axis of the wheel, one of said peripheral portions being formed of insulating material and the other of said peripheral portions being formed of conducting material of a width adapted to contact one of said conductors only, said wheels being so mounted that the conducting peripheral portion of one wheel makes electrical contact with only one of said conductors and the conducting peripheral portion of the other wheel makes electrical contact only with the other of said conductors, whereby each wheel has only one conducting portion at one side thereof and short-circuiting or arcing of said conductors is largely eliminated.

6. The structure set forth in claim 5, wherein said plane is disposed considerably to one side of the central plane of the wheel.

7. An aerial traveling device having in combination with the wall of a room, brackets secured to and projecting from said wall adjacent the top of said wall; a single current-conducting wire-like member comprising relatively insulated current-conducting elements supported from its under side by said brackets in spaced relation to said wall; means comprising two wheels, each having a conducting portion, supported on and traveling solely on the upper surface of said member; one of said conducting portions engaging only one of said elements and the other of said conducting portions engaging only the other of said elements; a vehicle-like car carried by and suspended from said means and disposed below said means; a motor supported by said means above said member; means for conducting current from said wheels to said motor; means for driving said wheels from said motor to move said first mentioned means along said member, said wire-like member including a portion extending in inclined position to the floor of said room and means for supporting said last named portion.

8. The combination with a supporting wire-like member comprising parallel longitudinally extending relatively insulated conductors, of a wheel running on said member and having one side made of conducting material to engage one of said conductors to conduct current therefrom and having the remainder thereof made of insulating material to engage the other of said conductors.

9. A traveling device having in combination, a single wire-like supporting member comprising parallel longitudinally extending relatively insulated conductors, supporting means therefor, a pair of wheels running on and supported by said member, one of said wheels having a peripheral portion of conducting material engaging one of said conductors and a peripheral portion of non-conducting material engaging the other of said conductors, the other wheel having a peripheral portion of conducting material engaging said other conductor and a peripheral portion of non-conducting material engaging said one conductor, a frame carried by said wheels and means supported by said frame and operated by current from said member transmitted through said wheels for driving said wheels to move the same along said member.

10. A traveling device having in combination, a single longitudinally extending member comprising parallel wire-like relatively insulated conductors, means comprising a pair of wheels supported on and movable along said member having peripheral conducting portions respectively engaging said conductors, a frame carried by said wheels, a motor carried by said frame adapted to be driven by current from said conductors, conductors for supplying current from said wheels to said motor, said motor having an armature shaft and worms secured to said armature shaft, said wheels being formed as worm wheels meshing respectively with said worms whereby said first mentioned wheels are driven from said motor.

11. An aerial traveling device having in combination, a wire-like member constituting a unit and comprising parallel longitudinally extending relatively insulated conductors, a pair of wheels running on and supported by said conductors and spaced longitudinally thereof, one of said wheels having a peripheral portion of conducting material engaging one of said conductors and a peripheral portion of non-conducting material engaging the other of said conductors, the other wheel having a peripheral portion of conducting material engaging said other conductor and a peripheral portion of non-conducting material engaging said one conductor, said wheels having grooved peripheries engaging said conductors and constructed and arranged to conduct current respectively from said conductors and means operated by said current for driving said wheels to move the same along said member.

12. A traveling device having in combination, a wire-like supporting member of small cross-sectional area comprising closely spaced parallel longitudinally extending relatively insulated conductors, means supporting said member, a wheel running on and supported by said member and having peripheral portions of conducting material respectively engaging said conductors, a frame in which said wheel is mounted, a casing simulating a bird carried by said frame, means supported by said frame operated by current from said member for rotating said wheel to move said casing along said member, means for conducting current from said wheels to said means, oscillatable members forming wings for said bird carried by said frame and means operated by said wheel for oscillating said wings as said casing moves along said member.

13. A traveling device having in combination, a supporting wire-like member comprising relatively insulated current-conducting elements; an object in the form of a bird movable along said member and disposed principally below the same; means suspending said object from said member including a wheel traveling on said member; said wheel having relatively insulated conducting portions, one of said conducting portions engaging only one of said elements and the other of said conducting portions engaging only the other of said elements; a motor carried by said object, means connecting said motor and said wheel to drive the latter; means for conducting current from said wheel conducting portions to said motor; movable members on said object simulating wings for said bird and means connecting said motor and last mentioned members for oscillating the same.

RUFUS R. RAND, JR.